April 6, 1926. 1,579,657
J. E. PERRAULT
ROLLER GUIDE FOR FLAP CUTTING AND BUILDING MACHINES
Filed Oct. 20, 1924
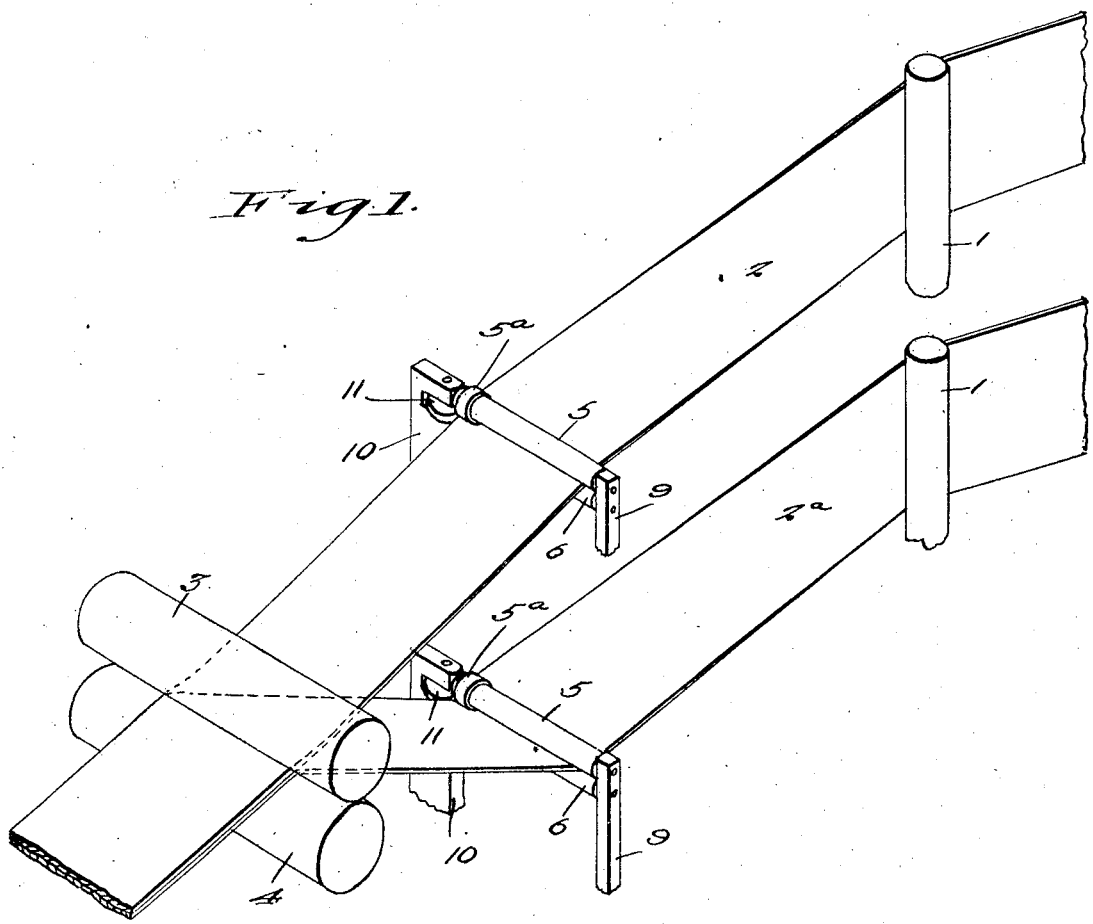
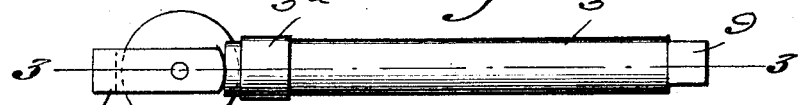
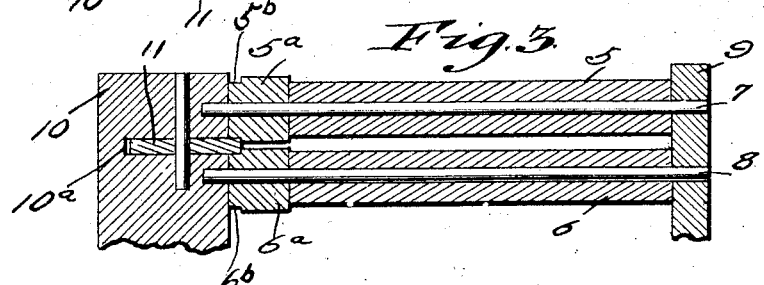
Inventor
Joseph E. Perrault
By Spear Middleton Donaldson & Hall
Attorney Patented Apr. 6, 1926.

1,579,657

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

ROLLER GUIDE FOR FLAP CUTTING AND BUILDING MACHINES.

Application filed October 20, 1924. Serial No. 744,777.

*To all whom it may concern:*

Be it known that I, JOSEPH E. PERRAULT, a citizen of the United States, and resident of Watertown, in the county of Middlesex and State of Massachusetts, have invented certain new and useful Improvements in Roller Guides for Flap Cutting and Building Machines, of which the following is a specification.

My present invention relates to an improved roller guide designed for use in connection with flap cutting and building machines such as disclosed in an application filed by me in the United States Patent Office on the 26th day of June, 1922, Serial No. 570,813.

In the use of such a machine, a traveling sheet of friction fabric is severed into a plurality of relatively narrow strips or bands, which are deflected by horizontal guides into different horizontal planes, whereafter they are aligned in groups by vertical guides, the bands or strips of each group being super-imposed and pressed together by rollers to form laminated bands or tire flap strips.

In the use of the machine shown in said application, there developed at times a tendency of the bands, which are of friction fabric and sticky or tacky, to curl at the edges or wrinkle, which would result in such curls or wrinkles being pressed down, resulting in a defective flap, and the present invention aims to provide means which will guard against such occurence.

The said invention comprises the novel construction hereinafter described and defined by the appended claims.

In order that the invention may be better understood, reference is made to the accompanying drawings, in which:—

Figure 1 is a perspective view, largely of a diagrammatic nature, showing two strips traveling around or over the several guides, and being united by the presser rollers, the frame and supporting parts being omitted for clearness of illustration.

Fig. 2 is a plan view of one set of guides.

Fig. 3 is a section on line 3—3 of Fig. 2.

Referring by reference characters to this drawing, the numerals 1 designate the vertical guides corresponding to the guides 16 and 17 of my aforesaid application, by which the strips or bands 2 and 2ª, which have been produced by the slitting up of the sheet, are deflected into vertical alignment one above the other for the purpose of subsequently joining them face to face to form the composite sheet by the presser rollers 3 and 4. Between the vertical guides 1 and the presser rollers 3 and 4 are interposed upper and lower pairs of horizontal guide rolls 5 and 6, the rolls of each pair being spaced apart to permit the passage of the friction fabric therebetween, whereby the fabric is properly guided to and between the uniting rollers 3 and 4. Due to the fact that the fabric is given a quarter turn in passing from the vertical guides 1 to the uniting rollers, I have found that by the use of horizontal guides such as disclosed at 19ᵇ, 19ᶜ and 19ᵈ in my aforesaid application, there is likelihood at times of the curling of the edges of the fabric and the possibility of wrinkling or distortion, and to avoid this I provide the special guide roller mechanism which will now be particularly described. This comprises upper and lower divided rollers 5 and 5ª, and 6 and 6ª, respectively, which are journaled on horizontal shafts 7 and 8 carried by frame members 9 and 10. The rollers 5ª and 6ª are spaced apart a distance just sufficient to admit the fabric, so as to bear on the opposite faces thereof, while the rollers 5 and 6 are spaced further apart to allow the free passage of the remaining portion of the fabric. The supporting bracket or standard 10, is provided with a horizontal recess 10ª in alignment with the space between the rollers, and in this recess is journaled a roller 11 the periphery of which contacts with the edges of the rollers 5 and 5ª, enclosing the space, and serves as an anti-friction guide for the edge of the strip. Preferably, the roller 11 is projected slightly beyond the face of the supporting bracket or standard, and the corresponding edges of the rollers 5ª and 6ª are rebated, as indicated at 5ᵇ and 6ᵇ, to form a groove into which the edge of the roller 11 projects.

Having thus described my invention, what I claim is:—

1. Fabric strip guiding means for the purpose described, comprising a pair of rollers journaled to rotate about parallel axes, and a roller journaled to rotate about an axis perpendicular to said axes and having its periphery closing the space between the parallel rollers, said last named rollers being spaced apart a distance corresponding to the fabric strip, whereby the rollers contact with opposite faces of the fabric and any wrinkling of the same or curling of its guiding edge is prevented.

2. Strip guiding means for the purpose described, comprising a pair of parallel shafts, cylindrical rollers journaled thereon adjacent one end thereof, with a space between corresponding to the thickness of the strip, cylindrical rollers journaled on the remaining portion of the shafts, and of less diameter than the first mentioned pair to provide a wider space between, and an anti-friction guide cooperating with the adjacent portions of the first mentioned pair of rollers at the outer ends thereof.

3. Strip guiding means for the purpose described, comprising a pair of parallel shafts, cylindrical rollers journaled thereon adjacent one end thereof, with a space between corresponding to the thickness of the strip, cylindrical rollers journaled on the remaining portion of the shafts, and of less diameter than the first mentioned pair to provide a wider space between, and a roller journaled to rotate about an axis perpendicular to said shafts, and having its periphery adjacent to and closing the space between said first mentioned rollers at the outer end thereof.

In testimony whereof, I affix my signature.

JOSEPH E. PERRAULT.